United States Patent [19]
Watkins et al.

[11] Patent Number: 5,098,472
[45] Date of Patent: Mar. 24, 1992

[54] PRESERVATIVE COMPOSITION

[75] Inventors: John B. Watkins, New South Wales; Harry Greaves; Chen W. Chin, both of Victoria, all of Australia

[73] Assignees: Commonwealth Scientific & Industrial Research Organization, Campbell; Koppers Australia Pty. Limited, North Sidney, both of Australia

[21] Appl. No.: 585,279

[22] Filed: Sep. 13, 1990

Related U.S. Application Data

[63] Continuation of Ser. No. 81,579, Jul. 31, 1987, abandoned, which is a continuation of Ser. No. 713,386, filed as PCT/AU84/00103, Jun. 13, 1984, abandoned.

[30] Foreign Application Priority Data

Jun. 17, 1983 [AU] Australia .............................. PF9867

[51] Int. Cl.$^5$ .............................................. C09D 5/14
[52] U.S. Cl. ................................... 106/15.05; 106/123.1; 106/162; 106/218; 106/219; 106/236; 106/241; 106/287.1; 106/311; 252/41; 252/352; 252/367; 252/282; 252/407; 252/7
[58] Field of Search ................... 106/15.05, 123.1, 162, 106/218, 219, 236, 241, 287.1, 311; 252/41, 352, 367, 382, 407; 525/7

[56] References Cited

U.S. PATENT DOCUMENTS 2,933,413  4/1960  Goldstein ........................... 427/417
3,378,381  4/1968  Deaganov ........................ 106/18.12
3,764,378  10/1973  Kemp .................................. 106/18.2
3,822,137  7/1974  Kemp .................................. 106/18.35
3,888,774  6/1975  Kemp .................................. 106/18.2
3,973,971  8/1976  Greco et al. ...................... 106/18.35

OTHER PUBLICATIONS

Derwent Abstract, Accession No. 82-32508E/15, Russian Patent No. SU-835749, 79.07.16.
Derwent Abstract, Accession No. 72-21901T/14, Russian Patent No. SU-300321, 69.11.21.
Derwent Abstract, Accession No. 79-71254B/39, Russian Patent No. SU-639705, 77.02.11.

*Primary Examiner*—Amelia Burgess Yarbrough
*Attorney, Agent, or Firm*—Ladas & Parry

[57] ABSTRACT

There is disclosed a preservative composition which is ultra stable in the presence of wood extractives comprising (a) an emulsion of a wood preservative grade creosote; (b) 5-95% water; (c) one or more pre-dispersed micronized pigments; (d) a rheology structuring agent present in an amount of 2.5 weight percent or less; (e) 0.25 to 10 weight percent of a soap which is an alkali metal salt of a wood derived resin acid; (f) 0.1 to 5 weight percent of a surfactant; (g) 0.25 to 2 weight percent of a natural or synthetic pigment modifying resins or anti-settle additive; and (h) 0.25 to 5 weight percent of a lignin sulfonate. The emulsion is produced under conditions of ultra-high sheer. A process for the manufacture of the preservative composition is also disclosed.

18 Claims, 1 Drawing Sheet

PRESERVATIVE COMPOSITION

This is a continuation of copending application Ser. No. 07/081,579 filed on July 31, 1987, now abandoned, which is a continuation of Ser. No. 713,386 filed as PCT/AU84/00103, Jun. 13, 1984, now abandoned.

TECHNICAL FIELD

The present invention relates to preservative compositions, their methods of manufacture, and use in preserving timber and other substrates. The compositions of the invention have unique modes of intra-component interaction and substrate- preservative- atmosphere interaction. More particularly, the invention relates to creosote based emulsions and derivatives, hereinafter referred to as pigment emulsified creosote (PEC).

The compositions of the present invention demonstrate novel substrate interactions with other known preservatives of a similar or an entirely opposite group resulting in a complementary enhanced preservative efficacy, and unique substrate morphology treatment.

BACKGROUND ART

Creosote has been in use for over three hundred years, U.K. patent No. 214 being issued to Becker, J. and Serle, H. in 1681. Its primary utilization has been in wood and fabric preservation with excursions into the fields of medicine, pharmacy, dyes, chemicals, carbon blacks and fuels.

The diverse and colourful history of creosote preservatives utilization and benefits has been marred only by inherent problems of odour, skin irritation and related product handling problems.

Drawbacks evidenced in the use of creosote in recent times are those of heating costs in plant use, flammability, odour, pollution and unacceptable oily, tarry or crud coated deposits on the surfaces of treated wood. Some or all of the above limit the use of creosote to the treatment of timber which is unlikely to come into contact with people or livestock. The inherent properties of raw creosote preclude its use in domestic applications and building or fabrication timbers in which an aesthetically pleasing wood preservative treatment could play a vital role in conservation and beneficiation of a diverse and desirable building resource.

The present invention enables creosote to be used as a preservative for lignocellulosic substrates and other substrates in simple and complex formulations, treatments and/or unique wide spectrum or highly specific complementary preservative roles substantially minimising the disadvantages of black, wet, bleeding, staining, tarry, oily, crudding surfaces, skin irritation, odour irritation, flammability, pollution and high energy costs. The potential benefits inherent in a cleaner creosote based preservative/preservation treatment are far reaching and so diverse as the variations in methods of treatment and preservative manipulation immanent in the invention.

Complaints on the handling difficulties associated with high temperature creosote (HTC) treated products were voiced in Australia shortly after the introduction of HTC in 1696. Many poles bled profusely in hot weather and developed tenacious, greasy or viscous tarry glossy surfaces termed "crud". HTC caused tactile skin sensitisation, irritation and burning on many individuals handling the treated timber. Other countries have had similar experience with creosote treated products. Despite extensive work in various parts of the world to elucidate the mechanism of bleeding and crud formation researchers have failed to produce a commercially acceptable improved creosote, and the problem persists.

During the 1970's ultra-fine pigmented HTC emulsions, which were referred to as "pigmented emulsified coloured creosote" and hereinafter termed "pigment emulsified creosote", were being developed in Australia. The emulsions consist of HTC, water and pigment, together with a small amount of emulsifiers and stabilisers. The result was a wood preservative based on creosote which provides a clean, aesthetically pleasing commodity.

Australian Patent No. 514 897 discloses those oil-in-water emulsions of creosote containing pre-dispersed micronised pigments which emulsions were produced under conditions of ultra-high shear. Such emulsions do not have the stability of the compositions of the present invention in the presence of wood extractives. In use under severe conditions of high temperatures and pressures and continuous shear the present compositions are superior to those of 514 897. The compositions of the invention are much less susceptible to contamination than those of 514 897.

Initially the creosote emulsion of 514 897 was used for brush, spray or dip treatment in general domestic applications, such as fencing and outdoor furniture. In 1975 the State Electricity Commission of Victoria (SECV) together with the Commonwealth Scientific and Industrial Research Organisation (CSIRO) tested the early emulsion in a pilot scale pressure treatment of round eucalypt pole stubs. The treated samples when removed from the cylinder were very wet, exhibiting a sludge-like pigment coating. However, the surface emulsion broke quickly upon exposure to air and the stubs dried rapidly.

A further pilot scale trail was then undertaken in which 200 transmission poles were treated with the emulsion of 514 897. The success of this trial not only demonstrated the stability of the emulsion but provided treated poles which were dry an aesthetically pleasing. On the basis of this result a contract was let to treat 3000 full sized eucalypt poles, and this commercial trial was commenced in 1979. In order to produce large volumes of the emulsion of 514 897 for the trial a new emulsion plant was commissioned. Unfortunately the emulsion was contaminated with residual Tanalith C solution remaining in the treatment plant and this led to an unstable emulsion which degraded after fourteen treatments. The emulsion was found to be a coarse dispersion of water/creosote mixture and not an ultra-fine emulsion as originally used. The trial was terminated after less than one third of the proposed poles was treated, because the emulsion could not be re-constituted.

More recent intensive research has led to the development of the present invention which provides a much more stable emulsion. An experiment has been designed to compare and contrast the invention with HTC, in terms of weight retention, penetrability, distribution, exudation, wetness, surface drying, cleanliness and smell.

DESCRIPTION OF THE INVENTION

In accordance with the invention there is provided a preservative composition which is ultra-stable in the presence of wood extractives, said composition comprising an emulsion of a wood preservative grade creosote, from 5 to 95% water, and one or more pre-dispersed micronised pigments, said emulsion having been produced under conditions of ultra high shear, characterised in that said composition contains from a trace to 2.5 wt% of a rheology structuring agent, from 0.25 to 10 wt% of an alkali metal salt of a wood derived resin, from 0.1 to 5 wt% of a surfactant, from 0.25 to 5 wt% of a lignin sulfonate and from 0.25 to 2 wt% of a pigment modifying resin, said percentages being based on the total weight of said emulsion.

The emulsions of the invention can be water-in-oil or oil-in-water depending upon the proportions of components present. Water-in-oil emulsions are preferred.

The compositions of the invention are capable of continuous use at temperatures exceeding 100° C. under pressure, corrected or uncorrected for component composition within pre-defined limits and able to withstand significant contamination by inert materials, opposing ions and chemicals and acid extractives from the timber substrates.

When the compositions of the invention are employed for commercial vacuum pressure impregnation (VPI) of timber, it is preferred that they contain from 0.1 to 0.2 wt% of the rheology structuring agent, 1 to 5 wt% of the alkali metal salt of a wood derived resin, from 0.1 to 0.5 wt% of the surfactant, from 0.25 to 1 wt% of the lignin sulfonate and from 0.25 to 2 wt% of the pigment modifying resin. For other applications, such as spraying, brushing or rolling, different amounts may be more suitable.

The amount of pigment employed in the compositions of the present invention depends on the depth of colour desired, however, up to 60% by weight of pigment, based on the total weight of the composition can be employed.

For commercial VPI, the preferred amount of pigment is 3.5 to 6 wt% and is usually higher for other applications.

The compositions of the invention exhibit a surprisingly strong buffering capacity. For example it has been discovered that even if the emulsion is broken by the addition of 10% glacial acetic acid, it can readily be restored to chemical and microscopic integrity on increasing the pH-value. One would expect that alkaline emulsions broken by the addition of acid cannot be re-emulsified on restoration of the original pH-values.

The preservative compositions of the invention can be modified by acids, alkalis or other chemicals to produce a selected pH-value, or by polymers, polymer emulsion additions, emulsion polymerization reactions, rubbers, tars, clays and highly specific inert chemicals to render it viscous, thixotropic, rheopectic, gel-like or a wax-like semi-solid paste.

The compositions of the invention can optionally contain further inorganic pigments, fillers or their mixtures whether untreated or pre-treated, organic pigments, pigments synthesised in the compositions of the invention and colours chemically produced in and based upon a component or components of the compositions of the invention.

Desirable optional components in the preservative composition of the invention are pre-treated and/or pre-coated micronised pigments or inert fillers capable of reaction within the emulsion and on or within the structure of the substrate to produce special effects and enhanced preservative efficacy within the treated substrate.

Either the creosote phase, and/or the water phase, can be modified chemically or fortified by the addition of water and/or oil soluble toxicants, phase-dispersed insoluble toxicants and/or toxicant modified slow release polymers or inert fillers to provide durable, long acting broad spectrum and/or highly specific bactericide, algicide, fungicide, insecticide and termiticide efficacy concomitant with a clean non-polluting and aesthetically pleasing treated substrate.

Water-soluble polymers are a desirable additive to bridge the density gap between oil and water, to structure the final emulsion rheologically and to prevent pigment settlement and/or caking during storage of the emulsion. It is preferred to use distilled, softened or demineralised water which can be modified to produce thixotropic or rheopectic emulsion compositions of an anionic, neutral or cationic nature.

Examples of suitable emulsifiers are silicones, amines, fatty acids, fatty acid residues, ethoxylated amines, soaps, detergents, alkanates, sodium lauryl sulfates, nonyl phenol ethoxylates, octyl phenol ethoxylates, cetyl stearyl alcohol ethoxylates, propylene glycol ethoxylates, alkyl aryl ethers, ethylene oxide condensates and sulfonates.

Other optional components of the preservative composition of the invention include coal tars, waxes, natural and/or synthetic resins, rosins, latexes, polymers, co-polymers, tri-polymers, driers, anti-oxidants, pour point-crystal formation-depressents, viscosity index and surface tension improvers, anti-skinning agents, u.v. absorbers, wetting agents, plasticisers, "long drying" additives, thixotropy additives, rheopectic additives, structuring agents, cross linking additives, colour retention aids, fillers, surfactants, anti-settle additives, dyes, metal suspensions, vegetable oils, mineral oils, thermal setting additives, metal soaps, hydrogenation catalysts, toxic additives, gelling agents, and binders.

In addition to use of pigments and dyes, colours can be produced by known reactions of components of creosote. For example, a red colour can be produced by heating creosote with concentrated sulfuric acid and glycerol to produce red sulfonic acids. Excess sulfuric acid should be neutralised or removed from the coloured creosote before the emulsion is prepared.

The grades of coal tar which may be used in the preservative compositions of the invention are covered by Australian Standard AS5007. They may be dissolved in the creosote prior to emulsification or in the finished emulsion in proportions up to 10% by weight of the creosote or finished emulsion. Tar may e dissolved in proportions up to 35% of the creosote content of the emulsion to provide for its use in marine environments. The refined tar to be dissolved in the creosote or its emulsion may be any one of the grades designated T0.008 to T0.500 or a combination of individual grades. The tar solution provides a superior treatment for timber sleepers, a lubricating/preservative treatment for rail spikes and/or a more tenacious coating/preservative for field application and/or below ground and ground-line maintenance of telegraph poles, fence posts and palings, etc. The tar solution acts as a repellant to cattle or livestock who might otherwise ingest straight creosote emulsion.

Bitumen, bitumen derivatives and bitumen emulsions may be incorporated in the same way that coal tar and its derivatives can be incorporated as detailed above.

Waxes used in the preservation compositions of the invention are paraffin waxes of various melting point specification from 47° C. through 127° C., beeswax (crude or refined), water soluble waxes of various grading and molecular weight added in proportion of up to 10% by weight of final emulsion. These waxes can be added individually or in combination dictated by finished emulsion and its desirable inherent qualities. The waxes can be added in the form of crude petroleum wax. The waxes are added to provide added waterproofing, self polishing characteristics in special formulations, to aid in emulsion particles, definition and/or distribution and/or ease of incorporation of highly micronised pigments in the finished emulsion. The waxes individually or in combination are incorporated in amounts up to 10% of finished emulsion. Natural waxes, such as Montan, Carnauba, atactic waxes and/or wax emulsions, may be incorporated in the compositions of the invention to enhance waterproofing, adhesion or polishing characteristics and promote immobility of the preservative compositions within the substrate.

Natural resins used in the preservative compositions of the invention are resins occurring naturally in plant or fossil species and extracted or processed from these products. Such resins as may be used in the invention include: gum copal, gum rosin, vatica resins, shellac, wood rosin (the polymerised or hydrogenated type), tall oil rosin, chinese wood oil, "AMINE-D" (Registered Trade Mark of Hercules Powder Company Inc., a mixture of high molecular weight primary amines derived from pine resin acids, of which the predominent amine is dehydroabietylamine) and casein (various grades). Derivatives of the above such as the pentachlorophenol derivative of AMINE-D are desired optional components of the invention.

Synthetic resins used in the preservative compositions of the invention are resins derived from natural products and/or wholly manufactured from hydrocarbon and/or modified hydrocarbons. Synthetic resins include resins manufactured from chemicals or compounds, other than hydrocarbons or in conjunction with hydrocarbons. Such resins as may be used in the invention include: aliphatic resins, aromatic resins, coumarone-indene, terpene resins, polyterpene resins, terpene phenol, alkyd resins, rhodenes, polyurethane resins and silicone resins.

Natural rubber buffings, which are a waste product in the tyre industry, may be included as synthetic resins because of additives already present in the rubber. The synthetic and natural resins and rubber buffings may be added in portions of up to 10% of finished emulsion. Up to 50% of synthetic and natural resins may be added for special formulations and effects.

Latexes used in the perservative compositions of the invention are natural and/or synthetic rubber emulsions, or block copolymer emulsions.

Such latexes as may be used in the invention include acrylic latexes, polyvinylchloride latexes, styrene butadiene latexes, acrylic styrene latexes, pure acrylic latexes, methylmethacrylate butadiene latexes.

Polymers used in the preservative compositions of the invention include polyisobutylenes, polystyrenes, block copolymers, styrene- isoprene- styrene, styrene-butadiene-styrene, styrene- ethylene- butylene- styrene, polyisobutylenes, nitrile rubber, hydrin, epichlohydrins, thermally active liquid polymers, carboxyl-terminated polybutadiene acrylinitrile, polyterpenes, polyesters and ethylene-vinyl acetate copolymers. These polymers may be used individually or in combination in up to 10% of finished emulsion and up to 50% for specialised requirements.

Driers useful in the preservative compositions of the invention include: calcium, lead, cobalt and manganese naphthenates, calcium, manganese, zinc and zirconium octoates, metal pexates, soya oil fatty acids, rape seed fatty acids, stearates, linseed oil, polymerised linseed oil and linoleic oils, fumaric acid, manganous oxide and o-phenanthroline.

Antioxidants useful in the preservative compositions of the invention include high molecular weight hindered phenols, hydrosulfites, butylated hydroxy toluenes, triphenyl phosphite, alkylated phenols, distearylthiodipropionates, organo- tins and organomercurials, methyl ethyl ketoxime, and hydroquinone.

A pour point-crystal formation depressant which has been found useful in the preservative composition of the invention is FLUXAN (Registered Trade Mark of BASF).

A viscosity index improver useful in the compositions of the invention is OPPANOL (Registered Trade Mark of BASF).

Methyl ethyl ketoxime and CRAVALLAC SF (A modified hydrogenated castor oil maufactured by Cray Valley Products Ltd. England) are useful as anti-skinning agents in the preservative compositions of the invention.

Examples of u.v. light absorbers useful in the preservative compositions of the invention are benzotriazole derivatives, hindered amines, benzophenones, benzoin ethers and coumarone derivatives.

Dow Corning 470A water soluble silicone copolymer is useful as a wetting agent.

Plasticisers which may be useful in the composition of the invention are, e.g. phthalates.

Examples of "long-drying" additives which may be used in the preservative composition of the invention are castor oil, rape seed oil, cottonseed oil, linseed oil, and coconut oil.

Useful thixotropy additives are CARBOPOL 940, 941, high molecular weight carboxyvinyl polymers. (Registered Trade Mark of B. F. Goodrich) and bentonite clays and fumed silicas.

Rheopectic additives which may be employed are, e.g. naphthalene, fatty acid derivatives and POLYOX RESINS (Registered Trade Mark Union Carbide Corporation).

Structuring agents useful in the composition of the invention are, e.g. CRAYVALLAC SF and bentonite clays.

Elastomers and film formers which may be used in the compositions of the invention are, e.g. butyl rubbers, natural rubbers, buffings, urethanes, methacrylate resins, polyamide resins, aromatic and aliphatic resins, high melting point paraffin waxes and coal derived high melting point waxes.

Surfactants which may be used in the preservative compositions of the invention are e.g. nonyl phenyl ethoxylates, alkanolamides, soya lecithins, ethoxylated sorbitan esters, alkyl and glycol esters, sulfonated castor oils, amine ethoxylates, acrylic copolymers, wetting agents and fluorine derivatives.

Examples of useful anti-settle additives for the compositions of the invention are anionic and cationic water soluble polymers and ANTI SETTLE CVP unmodified hydrogenated castor oil (Registered Trade Mark Cray Valley Products U.K.).

The foregoing driers, antioxidants, pour point-crystal formation-depressants, viscosity index improvers, anti-skinning agents, u.v. absorbers, wetting agents, plasticisers, "long-drying" additives, thixotropy additives, rheopectic additives, structuring agents, cross linking additives, elastomers, film formers, surfactants, colour retention aids and anti-settle additives may be used individually or in combination in amounts up to 10%. For highly specific end product or finished emulsion and/or reactions additions of some special additives such as smectic clay may be as high as 15%.

Fillers useful in the preservative compositions of the invention are e.g. Reynolds (USA) sodium aluminate powder, talc, diatomaceous earth, calcite, barytes, and silicates.

Dyes useful in the preservative compositions of the invention are oil soluble dyes which are used alone or in conjunction with pigments to heighten colour upon ageing, or upon initial application and to protect the finished product by deflecting some specific wavelengths light, inhibit u.v. effects and prevent tar-like exudate formation or inhibit oxidation. Dyes can be used in the compositions of the invention in a sacrificial mode to screen out u.v. and/or i.r. in initial stages of exposure of painted or treated surfaces so that fading occurs to heighten pigment colouration and precludes any tar formation or darkening. Examples of suitable dyes are INTERACETYL RED, INTERACETYL GREY, KCA oil yellow 2G, KCA oil orange E, KCA oil red A, CHROMOFINE orange 2R550, CHROMOFINE red B750, SEIKAFAST yellow M35, CHROMOFINE GREEN 2G550D and CHROMOFINE BLUE 5275.

The metallic pigments have found excellent use in imparting a "metallic" and lustrous finish alone or in conjunction with other colourants. This function of the compositions of the invention not only relies upon penetration of, and preservative value of, the creosote but provides added mechanical protection to surfaces for areas of exposure to severe conditions of environmental hazards such as dust, water, salt, fall-out, salt spray, chemical attack, etc. Suitable metallic pigments are e.g. bronze powders and aluminium pastes. The pastes are used in amounts of up to 10% alone or in combination with pigments and/or dyes.

Vegetable oils used in the compositions of the invention are oils derived from natural products and used as emulsion stabilisers, drying aids, extenders and solution aids for specific high resin additions. These oils are used to ensure compatability of some non-aromatic ingredients where long storage life is expected. They have been used to change vapour pressure characteristics of finished emulsion which is subsequently used in livestock areas or high density housing and population areas. They are used to assist in forming metal soaps. Some examples of these vegetable oils are tall oil, tallow fatty acids, fatty acid pitch, crude linseed oil, boiled linseed oil, polymerised linseed oil, soya bean oil, rapeseed oil, wood oils, stand oils, castor oil, stearic fatty acids and coconut fatty acids.

These oils are used in amounts up to 10% of the finished emulsion and for specific purposes up to 25% of the finished emulsion.

Mineral oils useful in the preservative compositions of the invention are oils or their refined fractions such as mineral turpentine used as solution additives, extenders, or to reduce the aromatic content of the emulsion or to enable specific formulation and difficult resin additions to be made. These oils aid in the solution of some rubbers, natural and synthetic, and promote even and tenacious film formation and binding for pigments. Examples of these mineral oils are mineral turpentine, paraffin oil, low aromatic oils, liquid paraffins, modified process oils, diesel fractions (kerosene cuts), process oils, high boiling aromatic oils and especially selected bottoms such as ethylene cracker bottoms. These oils are used in amounts up to 10% of finished emulsion and to higher percentages for specific extender or solution aid uses.

For thermal setting compositions, carefully selected polymers, resins, rubbers, driers are added to the finished emulsion to enable a thermal cure to be brought about in or on the treated surface either metallic or wood. The thermal set is brought about by blow-torch, hot air dryers, ovens, u.v. and/or i.r. irradiation or simply hot weather. Suitable additives to bring about a thermal set are e.g. aliphatic resins, aromatic resins, block copolymer resins, shellac, gum copal, chinese wood oil, wood resins, natural gums, acrylic emulsions, epoxies, two pot systems with urethane emulsions, copolymer resins, phenolic resins and phenolformaldehyde extracted emulsion additives. These resins are carefully blended in the emulsion up to 10% of finished emulsion, the 10% being a total additive effect blend or single component.

Rubbers used in the compositions of the invention are natural and/or synthetic rubbers to produce a tenacious film or increased binder effect for various pigment loadings and/or mixtures of pigment. The rubbers are added to produce a thick and/or resilient film and to fill gaps, holes and cracks in poor or degraded timber and/or fibro and to promote adhesion. Pigmented vulcanizing rubbers are desirable components of the compositions of the invention.

The rubbers are used especially to produce high pigment loaded complex anti-foul-emulsions for wooden hull treatment.

Metal soaps may be added to emulsions of resin metal complexes, water immiscible, which promote drying catalysed reactions in or on the surface treated and/or act as stabilisers, emulsifiers, or addition products in the whole system. The metal soaps are used to promote curing in the speciality formulations and where a specific film is intended. They aid toxicity levels in conjunction with other additives. The soaps greatly aid suspension of metallic pigments and other pigments. Examples of suitable metal soaps are aluminium stearate, zinc stearate, lead stearate, water soluble stearates, lithium hydroxy stearate, barium stearate, calcium stearate, zinc borate, zinc acetate and zirconium synthate. The metal soaps are used in small amounts up to 3.5% of whole emulsion and usually in combination with at least one other soap.

Catalysts which may be incorporated into the compositions of the invention are metal complexes or metal finely divided and added to creosote prior to emulsification. The catalyst is used to promote colour formation and retention by prevention of auto oxidation of the creosote. The catalysts used appear to benefit the ultimate colour effect by very minor "hydrogenation" reaction initiated by dilute NaOH or KOH or HCl addition during emulsification. Examples of such catalysts are Raney nickel catalyst, activated Raney nickel, barium oxide, tungsten carbide, zirconium, zirconium oxide, "Thorium catalyst", "Lithium catalyst", vanadium pentoxide, iron powder, tin hydroxide, boric acid, aluminium hydroxide, phosphoric acid and graphite.

Toxic additives are dispersed in emulsion dissolved in the water phase and/or oil phase to fortify preservation effect in high hazard areas where fungi, bacteria and termites represent increased hazard due to peculiar conditions such as high humidity, severe dry conditions, flooding, darkness and damp, salt spray, chemical vapours, tropical, subtropical, high u.v. irradiation, etc., exist. This invention enables easy and highly complex and or specific formulations to be made to meet any challenge to preservation in very high and/or unique hazard locations and situations. Examples of such toxic additives are pyrethrins, cresylic acids, mixed xylenols, phenyl mercury compounds, hexachlorophene, pentachlorophenol, TCMTB, copper pentachlorophenate, amine-D-pentachlorophenate, mercurials, arsenicals, boron complexes, dibutyl tin dilaurate, chlorinated hydrocarbons, metal naphthenates, copper ethanolamine 8-quinolinate. These additives are dispersed individually or in designed combination to form up to 10% of finished emulsion. Special circumstances of or initial treatments can utilise additions up to 15%.

Anti-coagulants, coagulants, delayed reaction initiators, pour point depressants, vapour suppressants, gel coat initiators, modified waxes, limpid point depressants, fire retardants and deodorants may also be added to the compositions of the invention. Examples of such additives are water soluble waxes, silicones (TERIC series), silicones (DOW specialities), silicone resins, alcohols, boron derivatives, anti-corrosives, E.D.T.A., metal chelates, amines and amine derivatives and/or complexes. These additives used individually or in combination up to 10% of finished emulsion for highly specific functions.

Gelling agents useful in the compositions of the invention are soluble polymers used to increase viscosity of water phase and thus emulsion and to produce thixotropy. The gel can be produced by oil soluble polymers. Some examples of suitable gelling agents are CARBOPOLS, POLYOX A range of water-soluble poly-(ethylene oxide) polymers having approximate weight average molecular weights derived from rheological measurements of between 300,000 and 5 million (Registered Trade Mark), UNITHANES Urethane polymers (Registered Trade Mark) CRAYVALLAC SF. These additives are very carefully controlled in either phase prior to emulsification and the level of addition and/or temperature and/or agitation can be utilised to govern gel structure or ultimate thixotropy, rheopexy in the finished emulsion. Up to 5% but usually much lower at around 0.5% on finished emulsion are used.

In another aspect, the invention provides a process for the manufacture of preservative compositions, which process comprises the steps of:

(i) dissolving from a trace to 2.5% by weight based on the total weight of said composition of a rheology structuring agent in 5 to 95% by weight of water based on the total weight of said composition to form a first solution;

(ii) ageing said first solution for at least 8 hours;

(iii) dissolving or forming from 0.25 to 10% by weight based on the total weight of said composition of an alkali metal salt of a wood derived resin and dissolving from 0.1 to 5% by weight based on the total weight of said composition of a surfactant in said aged first solution, concurrently or sequentially in any order, to form a second solution;

(iv) adding said second solution to creosote and forming a first emulsion under conditions of ultra-high shear;

(v) adding at least one pre-dispersed micronised pigment to said first emulsion;

(vi) adding from 0.25 to 5% by weight based on the weight of said composition of a lignin sulfonate to form a second emulsion; and (vii) adding from 0.25 to 2% by weight based on the weight of said composition of a pigment modifying resin;

and wherein mixing under conditions of ultra-high shear is performed after each of steps (v), (vi) and (vii). Alternatively the lignin sulfonate may be added in step (iii) and step (vi) omitted.

The ultra high shear blending of all components produces a very fine emulsion with unique characteristics, exhibiting exceptional stability relevant to temperature, pressure and continuous shear in hostile environments. The preservative compositions of the invention exhibit exceptional stability in the presence of opposing ions, acid, salt and chemical contamination as well as at or near critical inversion level of water content.

The preservative compositions of the invention exhibit exceptional stability under vacuum boiling conditions over long periods in the presence of green timber (Boultonising) and long periods of temperatures in excess of 130° C. under pressures up to 5500 kPa.

The preservative compositions of the invention are chemically processed under conditions of high shear to exhibit thixotropic behaviour upon standing and Newtonian behaviour when their yield value is exceeded by shearing or pumping and utilization above 60° C.

Whereas effective prior art creosote preservation of timber required high pressure and temperature, the creosote composition of the invention may be applied by any of the known methods for applying a coating to, or impregnating a surface or sapwood in transmission line poles, natural round poles and posts, and softwoods, and hardwoods. Liquid preparations of the invention may e applied to porous substrates, by impregnation at ambient or elevated pressures and at ambient or elevated temperatures. Liquid compositions of the invention may also be applied to surfaces by spraying, brushing or rolling. The viscosity of the composition may be adjusted so that the compositions have the consistency of a liquid-paste, wax or gel. When the compositions of the invention are in those forms they may also be applied to surfaces by rubbing. As indicated above, when thermal setting compositions are incorporated into the compositions of the invention, the coatings once applied can be toughened by the application of heat.

The preservative composition of the invention are formulated and processed to exhibit optimum rheological behaviour at or about 60° C. in the timber treatment process whether that be dipping, soaking, brushing, rolling and/or autoclaving at low or high pressures.

The compositions of the invention are designed and formulated to improve in rheological behaviour and microscopic integrity (particle size and distribution of all phases and components) with continuous and/or repeated use in pressure plant facilities.

Therefore, according to a third aspect of the invention, there is provided a method of preserving lignocellulosic substrates, and other substrates which method comprises applying to said substrates a preservative composition which is ultra-stable in the presence of wood extractives, said composition comprising an emulsion of a wood preservative grade creosote, from 5 to 95% water, and one or more pre-dispersed micronised pigments, said emulsion having been produced under conditions of ultra high shear, characterised in that said composition contains from a trace to 2.5 wt% of a rheology structuring agent, from 0.25 to 10 wt% of an alkali metal salt of a wood derived resin, from 0.1 to 5 wt% of a surfactant, from 0.25 to 5 wt% of a lignin sulfonate and from 0.25 to 2 wt% of a pigment modifying resin, said percentages being based on the total weight of said emulsion. Thus the invention provides a method of treating timber to requisite world wide standard specifications at much lower temperatures than heretofore required utilizing high temperature creosotes and similar oil based preservatives, for highly significant energy savings, savings in plant preparations time and equipment wear and tear.

The compositions of the invention exhibit much reduced vapour emissions at temperatures up to 95° C., immediately after the autoclave door is opened in the pressure impregnation of timber and in the immediate vicinity of the treated timber removed hot from the autoclave. The vapours dissipate rapidly and are dissimilar to those of the base creosote. Similarly with brushing, spraying, dipping, rolling or soaking at ambient or elevated temperatures the vapours are much reduced and are of a less irritant nature than HTC at the same temperature.

The compositions of the invention evidence much reduced skin irritation when freshly treated, timber sections are non-greasy, much safer to handle and dry rapidly in the open atmosphere. Reduced bleeding occurs in storage and the surface of the PEC treated timber dries to an aesthetically pleasing "powdery"-dry rustic appearance with further exposure, irrespective of high surface temperatures encountered up to 65° C. No creosote exudes from the treated timber surface after the drying reaction is complete.

Examples of lignocellulosic substrates are timber, plywood, particle board, Scrimber [Registered Trade Mark of Repco Ltd. (reconsolidated wood)] and hardboard. Other substrates are, for example metal and masonry as the compositions of the invention are also useful as marine anti-foulants and can be used as coatings for swimming pool walls and floors to minimise growth of algae.

At known densities, timber or other substrate treated with the compositions of the invention absorbs more total liquid (approximately 30% mass per unit volume) than matched specimens treated with high temperature creosote under identical conditions and schedules. Total nett pick up of high temperature creosote is similar.

When used as a timber preservative, the compositions of the invention are believed to penetrate the cell walls thereby introducing creosote and/or broad spectrum, and/or highly specific toxicants into the most vulnerable microstructure of the wood. Toxicants carried into the cell wall and possibly into the capillaries within the cell wall in the water phase of the PEC are deposited, upon breaking of the emulsion in the acid substrate within the cells, to provide preservation of the ultrastructural range.

In timber, the compositions of the invention penetrate the bordered pits because of the natural affinity for water which was transported in the living tree from cell to cell via the bordered pits which act as valves in the sapwood of living trees. The closure of these "doors" in the partially dried sapwood ready for treatment is restrictive to high temperature creosote penetration but accessible to PEC which emulsion breaks within the substrate soon after treatment to deposit toxicants and creosote in the cells which are sealed against loss of creosote or added toxicant by deposition of pigment and/or fillers in these "doors". The same unique function of the invention obviates bleeding with time and temperature.

When used in timber preservation, the compositions of the invention with or without additives penetrate readily from the rays into the tracheids of softwoods, can flush and/or emulsify resins and gums to widen conducting elements for the liquid and upon the breaking of the emulsion by the acid medium and time, deposit toxicants which are sealed in the treated timber by deposition of pigment and/or fillers which obviates bleeding.

The compositions of the invention can be varied to a degree that permits ordered regulation of the distribution of preservatives and additives within the structure of penetrable soft and hardwoods the whole further affected by heat and/or pressure and/or time because of the designed chemistry and stability of the emulsions.

The compositions of the invention provide an ultra stable emulsion which can be modified by addition of inert fillers, specialised chemicals and non-flammable organic liquids and complex solutions, colloids and/or other emulsions to impart fire retardancy to the preservative treated timber. Especially significant is the range of fire retardant organic liquids which can be dissolved in and/or emulsified with the creosote to produce a fire retardant preservative with none of the vapour problems associated with some of the organic liquids alone. Some fire retardant chemicals which can be emulsified in the invention do exhibit inherent preservative efficacy and would complement the compositions of the invention.

Fire retardant compositions of the invention can be utilized to treat timbers suitable for indoor and outdoor building timbers to furnish coloured fire-retardant preserved timber construction materials, maintenance free in a wide range of architectural or industrial finishes.

The compositions of the invention exhibit natural fire retardancy imparted to the timber substrate treated with PEC by dipping, diffusion, soaking or pressure impregnation.

PEC can be utilized in conventional pressure impregnation systems at much lower temperatures than HTC or conventional oil based preservatives to achieve standard loadings, a clean dry surface and maintain environmentally acceptable plant, facilities and product. Vapour pressure is low, organic vapours negligible and any residues are re-usable in the process. Heat input is minimal and heat losses to environment negligible.

The compositions of the invention are exothermic during pumping and re-circulation so that heat up times are short and energy conservative.

The compositions of the invention exhibit natural affinity for tanalith and other inorganic salt preservative treated timber and enable a wide variety of double preservative treatment schedules to be carried out for marine environment timbers as well as chemical or hazardous location timbers.

While all grades of creosote are envisaged within the scope of the invention the preferred creosotes are those derived from high temperature coal tar distillates especially crystal-free oils and clear oils; e.g., those which meet Americal Wood Preserver's Association's standard AWPA P 1-69 and also ASTM D390, AS K55, AS 1143, BS3051, BS 144 and SABS 538/539/540.

An important contribution of the invention is that a true wood preservative paint which can be applied by the house-holder and which dries to a clean surface has been provided; such a product was not previously available. If it was desired to coat timber in an existing installation such as a house or a fence, the choice was between a preservative which did not completely dry and had an unattractive finish or a paint which had an attractive finish and was not a true timber preservative. Building timbers and other substrates pretreated with compositions of the invention can be utilized in domestic, industrial and agricultural fabrications or pre-fabricated products.

Applications for the preservative composition of the invention range from specialised uses such as pressure impregnation of telegraph poles and mining, fencing, vigneron and oyster stake timbers through to indoor and outdoor domestic building products. Creosote has been used to put lines on the grass of football fields, however, it had the disadvantage of killing the grass. The compositions of the invention can be used in this application, especially those containing casein, which compositions do less damage to the grass than straight creosote. The composition is applied to such products by spraying, brushing, oiling, rubbing, polishing, soaking dipping and all forms of industrial wood preservation treatments. Most importantly the composition of the invention can be applied by high pressure, high or low temperature autoclaving.

A suitable apparatus to mix the emulsion under conditions of ultra high shear is the "Ultra Turrax" or "Dispax-Reactor" manufactured by Janke and Kunkel K. G. in the Federal Republic of Germany.

The following Examples illustrate the manufacture of compositions according to the invention. The examples are to be construed as illustrative only and do not serve to limit the scope of the invention.

EXAMPLE 1

The following were blended in an Ultra Turrax using a T 45 66 Generator at 1050 rad.sec$^{-1}$, at a temperature of 35° C. and in the sequence described below, to produce a brown coloured creosote anionic emulsion of water-in-oil type.

|  | Parts by Weight |
| --- | --- |
| Distilled water | 30 |
| Polysaccharide (1) | 0.12 |
| Resin soap (2) | 3.42 |
| Alkane sulfonate sodium salt (3) | 0.14 |
| High temperature creosote (AS 1143) | 70 |
| Pigment MC.1 brown oxide (4) | 3.5 |
| Lignim sulfonate (5) | 0.46 |
| ANTI-SETTLE C.V.P. (6) | 0.32 |

(1) KELZAN D. (A xanthan gum polysaccharide marketed by Merck and Co., New Jersey.)
(2) Alkali metal salt of Vinsol Resin.
(3) LUTENSIT A.P.S. (A sodium alkane sulfonate manufactured by BASF, West Germany.)
(4) Harshaw all phase pre-dispersed pigment.
(5) POLYFON F. (A lignin sulfonate manufactured by Westvaco Corporation, New York.)
(6) Cray Valley Products U.K.

EXAMPLE 2

The procedure of Example 1 was followed using the following components to produce a brown coloured creosote emulsion modified by the addition and phase dispersion of Busan 30, the said emulsion of the example being toxicant fortified and efficacy specific for preservation of lignocellulosic substrates in soft rot hazard areas.

|  | Parts by Weight |
| --- | --- |
| Distilled water | 30 |
| Polysaccharide | 0.12 |
| Resin soap | 3.42 |
| LUTENSIT A.P.S. | 0.14 |
| High temperature creosote (AS 1143) | 70 |
| Pigment MC.1 Brown Oxide | 3.5 |
| Lignin sulfonate | 0.46 |
| ANTI-SETTLE C.V.P. | 0.32 |
| *BUSAN 30 (A proprietary formulation containing 30% 2-thiocyanomethylthio benzothiazole, marketed by Buckman Laboratories Pty Ltd, Australia.) | 3.0 |

*Registered Trademark Buckman Laboratories Inc., U.S.A.

EXAMPLE 3

The procedure of Example 1 was followed using the following components to produce a brown coloured creosote emulsion which was polymer modified after pressure impregnation into the sapwood of natural round eucalypt species quadrants, to produce a thin, pigmented, waterproof creosote film on the surface of the PEC treated pole sections. The resin is applied to the surface of the treated timber after it is removed from the pressure cylinder and prior to evaporation of the water of emulsion.

|  | Parts by Weight |
| --- | --- |
| Distilled water | 30 |
| Polysaccharide | 0.12 |
| Resin soap | 3.42 |
| LUTENSIT A.P.S. | 0.14 |
| High temperature creosote (AS 1143) | 70.0 |
| Pigment MC.-1 Brown Oxide | 3.5 |
| Lignin sulphonate | 0.46 |
| ANTI-SETTLE C.V.P. | 0.32 |
| Hydroxyl terminated liquid polybutadiene resin | 4.0 |

EXAMPLES 4 TO 102

The procedure of Example 1 was follows using the following components in the amounts listed in Table 1.
1 Water
2 KELZAN D
3 Vinsol Resin Soap
4 Lutensit A.P.S.
5 POLYFON F
6 ANTI SETTLE C.V.D.
7 High Temperature Creosote (AS 1143)
8 Pigment MC.1 (Brown)
9 Pigment MC-W . . . . . . . . . . . (White)
In Table 1 all values are parts by weight based on the total weight of the emulsion.

TABLE 1

| EXAMPLE NUMBER | Component (parts by weight) | | | | | | | | |
|---|---|---|---|---|---|---|---|---|---|
| | 1 | 2 | 3 | 4 | 5 | 6 | 7 | 8 | 9 |
| 4 | 30 | 1 | 0.25 | 2.5 | 2.5 | 2 | 70 | 5 | — |
| 5 | 30 | 1 | 0.25 | 2.5 | 5 | 1 | 70 | 5 | — |
| 6 | 30 | 1 | 0.25 | 2.5 | 5 | 2 | 70 | 5 | — |
| 7 | 30 | 1 | 0.25 | 5 | 2.5 | 1 | 70 | 5 | — |
| 8 | 30 | 1 | 0.25 | 5 | 2.5 | 2 | 70 | 5 | — |
| 9 | 30 | 1 | 0.25 | 5 | 5 | 1 | 70 | 5 | — |
| 10 | 30 | 1 | 0.25 | 5 | 5 | 2 | 70 | 5 | — |
| 11 | 30 | 1 | 10 | 2.5 | 2.5 | 1 | 70 | 5 | — |
| 12 | 30 | 1 | 10 | 2.5 | 2.5 | 2 | 70 | 5 | — |
| 13 | 30 | 1 | 10 | 2.5 | 5 | 1 | 70 | 5 | — |
| 14 | 30 | 1 | 10 | 2.5 | 5 | 2 | 70 | 5 | — |
| 15 | 30 | 1 | 10 | 5 | 2.5 | 1 | 70 | 5 | — |
| 16 | 30 | 1 | 10 | 5 | 2.5 | 2 | 70 | 5 | — |
| 17 | 30 | 1 | 10 | 5 | 5 | 1 | 70 | 5 | — |
| 18 | 30 | 1 | 10 | 5 | 5 | 2 | 70 | 5 | — |
| 19 | 30 | 5 | 0.25 | 2.5 | 2.5 | 1 | 70 | 5 | — |
| 20 | 30 | 5 | 0.25 | 2.5 | 5 | 2 | 70 | 5 | — |
| 21 | 30 | 5 | 0.25 | 5 | 2.5 | 2 | 70 | 5 | — |
| 22 | 30 | 5 | 0.25 | 5 | 5 | 1 | 70 | 5 | — |
| 23 | 30 | 5 | 0.25 | 5 | 5 | 2 | 70 | 5 | — |
| 24 | 30 | 5 | 10 | 2.5 | 2.5 | 1 | 70 | 5 | — |
| 25 | 30 | 5 | 10 | 2.5 | 2.5 | 2 | 70 | 5 | — |
| 26 | 30 | 5 | 10 | 2.5 | 5 | 1 | 70 | 5 | — |
| 27 | 30 | 5 | 10 | 2.5 | 5 | 2 | 70 | 5 | — |
| 28 | 30 | 5 | 10 | 5 | 2.5 | 1 | 70 | 5 | — |
| 29 | 30 | 5 | 10 | 5 | 2.5 | 2 | 70 | 5 | — |
| 30 | 30 | 5 | 10 | 5 | 5 | 1 | 70 | 5 | — |
| 31 | 30 | 5 | 10 | 5 | 5 | 2 | 70 | 5 | — |
| 32 | 70 | 1 | 0.25 | 2.5 | 2.5 | 1 | 30 | 5 | — |
| 33 | 70 | 1 | 0.25 | 2.5 | 2.5 | 2 | 30 | 5 | — |
| 34 | 70 | 1 | 0.25 | 2.5 | 5 | 1 | 30 | 5 | — |
| 35 | 70 | 1 | 0.25 | 2.5 | 5 | 2 | 30 | 5 | — |
| 36 | 70 | 1 | 0.25 | 5 | 2.5 | 1 | 30 | 5 | — |
| 37 | 70 | 1 | 0.25 | 5 | 2.5 | 2 | 30 | 5 | — |
| 38 | 70 | 1 | 0.25 | 5 | 5 | 1 | 30 | 5 | — |
| 39 | 70 | 1 | 0.25 | 5 | 5 | 2 | 30 | 5 | — |
| 40 | 70 | 1 | 10 | 2.5 | 2.5 | 1 | 30 | 5 | — |
| 41 | 70 | 1 | 10 | 2.5 | 2.5 | 2 | 30 | 5 | — |
| 42 | 70 | 1 | 10 | 2.5 | 5 | 1 | 30 | 5 | — |
| 43 | 70 | 1 | 10 | 2.5 | 5 | 2 | 30 | 5 | — |
| 44 | 70 | 1 | 10 | 5 | 2.5 | 1 | 30 | 5 | — |
| 45 | 70 | 1 | 10 | 5 | 2.5 | 2 | 30 | 5 | — |
| 46 | 70 | 1 | 10 | 5 | 5 | 1 | 30 | 5 | — |
| 47 | 70 | 1 | 10 | 5 | 5 | 2 | 30 | 5 | — |
| 48 | 70 | 5 | 0.25 | 2.5 | 2.5 | 1 | 30 | 5 | — |
| 49 | 70 | 5 | 0.25 | 2.5 | 2.5 | 2 | 30 | 5 | — |
| 50 | 70 | 5 | 0.25 | 2.5 | 5 | 1 | 30 | 5 | — |
| 51 | 70 | 5 | 0.25 | 2.5 | 5 | 2 | 30 | 5 | — |
| 52 | 70 | 5 | 0.25 | 5 | 2.5 | 1 | 30 | 5 | — |
| 53 | 70 | 5 | 0.25 | 5 | 2.5 | 2 | 30 | 5 | — |
| 54 | 70 | 5 | 0.25 | 5 | 5 | 1 | 30 | 5 | — |
| 55 | 70 | 5 | 0.25 | 5 | 5 | 2 | 30 | 5 | — |
| 56 | 70 | 5 | 10 | 2.5 | 2.5 | 1 | 30 | 5 | — |
| 57 | 70 | 5 | 10 | 2.5 | 2.5 | 2 | 30 | 5 | — |
| 58 | 70 | 5 | 10 | 2.5 | 5 | 1 | 30 | 5 | — |
| 59 | 70 | 5 | 10 | 2.5 | 5 | 2 | 30 | 5 | — |
| 60 | 70 | 5 | 10 | 5 | 2.5 | 1 | 30 | 5 | — |
| 61 | 70 | 5 | 10 | 5 | 2.5 | 2 | 30 | 5 | — |
| 62 | 70 | 5 | 10 | 5 | 5 | 1 | 30 | 5 | — |
| 63 | 70 | 5 | 10 | 5 | 5 | 2 | 30 | 5 | — |
| 64 | 30 | 1 | 0.25 | 2.5 | 2.5 | 2 | 70 | — | 5 |
| 65 | 30 | 1 | 0.25 | 2.5 | 5 | 1 | 70 | — | 5 |
| 66 | 30 | 1 | 0.25 | 2.5 | 5 | 2 | 70 | — | 5 |
| 67 | 30 | 1 | 0.25 | 5 | 2.5 | 1 | 70 | — | 5 |
| 68 | 30 | 1 | 0.25 | 5 | 2.5 | 2 | 70 | — | 5 |
| 69 | 30 | 1 | 10 | 2.5 | 5 | 2 | 70 | — | 5 |
| 70 | 30 | 5 | 0.25 | 2.5 | 2.5 | 1 | 70 | — | 5 |
| 71 | 70 | 1 | 0.25 | 2.5 | 2.5 | 1 | 30 | — | 5 |
| 72 | 70 | 1 | 0.25 | 2.5 | 2.5 | 2 | 30 | — | 5 |
| 73 | 70 | 1 | 0.25 | 2.5 | 5 | 1 | 30 | — | 5 |
| 74 | 70 | 1 | 0.25 | 2.5 | 5 | 2 | 30 | — | 5 |
| 75 | 70 | 1 | 0.25 | 5 | 2.5 | 1 | 30 | — | 5 |
| 76 | 70 | 1 | 0.25 | 5 | 2.5 | 2 | 30 | — | 5 |
| 77 | 70 | 1 | 0.25 | 5 | 5 | 1 | 30 | — | 5 |
| 78 | 70 | 1 | 0.25 | 5 | 5 | 2 | 30 | — | 5 |
| 79 | 70 | 1 | 10 | 2.5 | 2.5 | 1 | 30 | — | 5 |
| 80 | 70 | 1 | 10 | 2.5 | 2.5 | 2 | 30 | — | 5 |
| 81 | 70 | 1 | 10 | 2.5 | 5 | 1 | 30 | — | 5 |
| 82 | 70 | 1 | 10 | 2.5 | 5 | 2 | 30 | — | 5 |
| 83 | 70 | 1 | 10 | 5 | 2.5 | 1 | 30 | — | 5 |
| 84 | 70 | 1 | 10 | 5 | 2.5 | 2 | 30 | — | 5 |
| 85 | 70 | 1 | 10 | 5 | 5 | 1 | 30 | — | 5 |
| 86 | 70 | 1 | 10 | 5 | 5 | 2 | 30 | — | 5 |
| 87 | 70 | 5 | 0.25 | 2.5 | 2.5 | 1 | 30 | — | 5 |
| 88 | 70 | 5 | 0.25 | 2.5 | 2.5 | 2 | 30 | — | 5 |
| 89 | 70 | 5 | 0.25 | 2.5 | 5 | 1 | 30 | — | 5 |
| 90 | 70 | 5 | 0.25 | 2.5 | 5 | 2 | 30 | — | 5 |
| 91 | 70 | 5 | 0.25 | 5 | 2.5 | 1 | 30 | — | 5 |
| 92 | 70 | 5 | 0.25 | 5 | 2.5 | 2 | 30 | — | 5 |
| 93 | 70 | 5 | 0.25 | 5 | 5 | 1 | 30 | — | 5 |
| 94 | 70 | 5 | 0.25 | 5 | 5 | 2 | 30 | — | 5 |
| 95 | 70 | 5 | 10 | 2.5 | 2.5 | 1 | 30 | — | 5 |
| 96 | 70 | 5 | 10 | 2.5 | 2.5 | 2 | 30 | — | 5 |
| 97 | 70 | 5 | 10 | 2.5 | 5 | 1 | 30 | — | 5 |
| 98 | 70 | 5 | 10 | 2.5 | 5 | 2 | 30 | — | 5 |
| 99 | 70 | 5 | 10 | 5 | 2.5 | 1 | 30 | — | 5 |
| 100 | 70 | 5 | 10 | 5 | 2.5 | 2 | 30 | — | 5 |
| 101 | 70 | 5 | 10 | 5 | 5 | 1 | 30 | — | 5 |
| 102 | 70 | 5 | 10 | 5 | 5 | 2 | 30 | — | 5 |

The formulations produced in Examples 4 to 63 were subjected to seven cycles of freezing at −18° C. for 16 hours followed by thawing for 8 hours. The emulsions remained stable visually. Examples 64 to 102 heated up to 100° C. for seven days and then cooled to ambient temperature. The emulsions remained stable visually.

The following comparative example illustrate the difference between the compositions of the present invention and those produced according to Australian Patent No. 514 897.

COMPARATIVE EXAMPLE

The formulation of Example 1 of Australian Patent No. 514 897 (Formulation A) was compared with the formulation of Example 1 (Formulation B) for stability to heat, addition of wood extractives, cation additions and freezing/thawing.

1. Stability to Heating (i) 3 sets of 1L samples of Formulation A and Formulation B were placed in ovens at temperatures 50° C., 70° C. and 90° C. for 4 days. Each sample was then assessed visually.

(ii) The above samples were subjected to further heating at the same temperatures for 3 more days. Stability of each was again assessed visually.

2. Stability to Wood Extractives

Fresh wood extractive expressed from "green" messmate stubs and used for Formulation A and Formulation B.1, 2.5, 5.0, 7.5 and 10 percent by mass of extractive were added to fresh emulsion samples and thoroughly stirred. The final mass of each sample was 100 g. The contaminated samples were allowed to stand overnight before visual assessment.

3. Stability to Tanalith-C Solution 2 percent by weight of Tanalith-C solution was used. Contamination of fresh emulsions was carried out as in 2. above and the stability of each sample was assessed visually.

4. Stability of Freeze-thaw 1L of fresh Formulation A and 1L of fresh Formula B were placed in a freezer at temperature of −18° C. for 7 days.

The samples were allowed to thaw before assessment of emulsion stability was carried out visually.

TABLE 2

| Tests | Formulation A | Formulation B |
|---|---|---|
| 1. Stability to heat | | |
| (i) 50° C. for 4 days | Settle | No effect |
| 70° C. for 4 days | Break and Settle | No effect |
| 90° C. for 4 days | Break and Settle | No effect |
| (ii) 50° C. for 7 days | Settle | No effect |
| 70° C. for 7 days | Break and Settle | No effect |
| 90° C. for 7 days | Break and Settle | No effect |
| 2. Stability to addition of wood extractive | 2 layers formed, could not be remixed | No effect |
| 3. Stability to cation addition (2% Tanalith-C) | 2 layers formed, could not be remixed | Initially appeared to separate and re-emulsified upon agitation |
| 4. Freeze-thaw stability −18° C. | Substantial crystal formation. Emulsion broke and settled on thawing | Emulsion solidified and thawed to a homogeneous emulsion |

EXAMPLE 103

Figure 1:
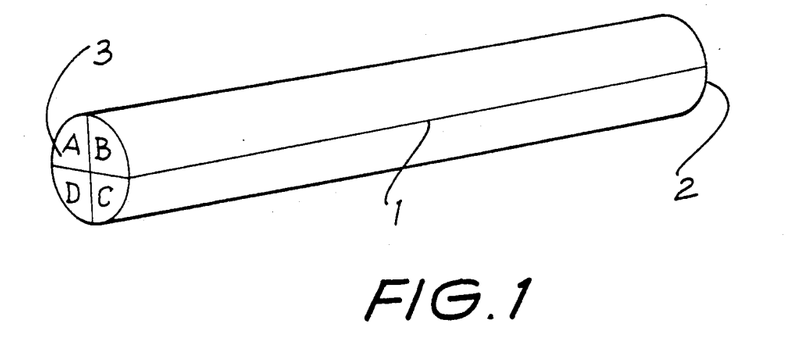
FIG. 1 illustrates quadrants of a pole treated in Example 124.

1.4 m stubs of eight ash type eucalypt stubs (including *Eucalyptus regnans*, *E. oblique* and *E. eugeniodies*) were sawn from the butt end of air-dried 11 m poles. For the experiment each stub was cut into four quadrants, numbered and allocated for treatment as shown in FIG. 1.

For each quadrant the sapwood thickness of both ends of three points was determined using methyl orange indicator, and the treatable volume calculated. Each sample was then double coated with impermeable epoxy resin on both sawn faces (1) and the top end (2) (see FIG. 1). This was to ensure that end grain penetration of the preservative was limited to the butt end (3) (the unsealed end) as well as the outer curved surface. Surface conditions of each quadrant was noted and photographed.

A Lowry schedule was used for the treatment of all quadrants with 1400 kPa pressure for 100 minutes followed by a final vacuum of −85 kPa for 30 minutes. The treatment temperatures were 60° C. and 90° C. for both the emulsion prepared according to Example 1 and HTC. Quadrant A was treated with the emulsion at 60° C., quadrant B was treated with the emulsion at 90° C.; quadrants C and D were treated with HTC at 90° C. and 60° C. respectively. In Australia the commercial treatment of poles with HTC is usually carried out at 90° C. or higher. As Hösli and Bosshard in *Holz als Roh-und Werkstoff* 37:445–461 (1979) have pointed out that there is no significant decrease in the viscosity of creosote when its temperature is increased above 60° C., part of the test was conducted at 60° C. Many types of emulsions can be destabilised at elevated temperature and to test the stability of the emulsion of Example 1 it was thermally stressed at 90° C. for half of the total number of charges.

To calculate retentions the weight of each quadrant was determined before and after treatment. Although some preservative penetration in the heartwood was observed in a few samples, it was assumed that only the sapwood had been fully treated.

Figure 2:
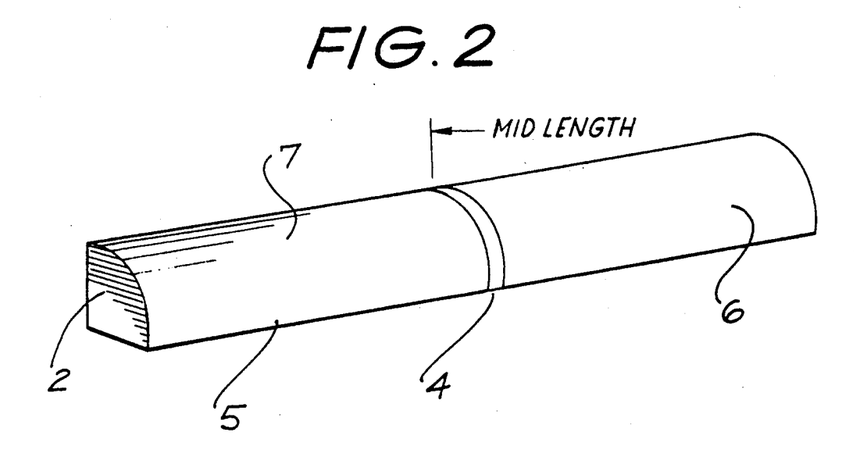
FIG. 2 illustrates how a quadrant of FIG. 1 was cut for testing after treatment.

Observations were made on the fuming of the preservatives, especially at the higher temperature, handling of treated samples, and their surface appearance. The emulsion was sampled before and after each charge and samples analysed for water content, pigment level, pH, viscosity, rheological behaviour over many shear rates/temperatures, and the microscopic structure of the emulsion. A disc (4) of 25 mm thickness was removed from the mid-length of each treated quadrant (5) (see FIG. 2) and stored at −18° C. for later visual assessment of the preservative distribution in the transverse face. The butt section (6) of the cross-cut quadrant (5) was stored at 5° C. for later assessment for the longitudinal distribution pattern. The remaining half-length (7) was exposed in the open for appraisal of the surface condition over a prolonged period.

Fourteen of the sixteen quadrants treated with the emulsion achieved higher retentions (based on emulsion) than the corresponding side-matched samples treated with HTC at the same temperature (refer to Table 3).

TABLE 3

| | WEIGHT RETENTIONS | | | | | |
|---|---|---|---|---|---|---|
| | Pigment Emulsified Creosote | | | | High Temp. Creosote | |
| | 60° C. | | 90° C. | | | |
| Stub No | Emulsion | Creosote* | Emulsion | Creosote* | 60° C. | 90° C. |
| 1 | 279 | 188 | 386 | 264 | 354 | 329 |
| 2 | 439 | 296 | 482 | 330 | 203 | 365 |
| 3 | 514 | 348 | 314 | 213 | 296 | 253 |
| 4 | 766 | 519 | 569 | 386 | 421 | 409 |
| 5 | 420 | 282 | 299 | 208 | 226 | 191 |
| 6 | 336 | 226 | 243 | 169 | 300 | 236 |
| 7 | 318 | 214 | 568 | 396 | 607 | 535 |
| 8 | 391 | 263 | 400 | 279 | 362 | 362 |
| Mean | 433 | 292 | 408 | 281 | 346 | 335 |

*For emulsion, the retention values are based on actual creosote, i.e. water, pigment, emulsifiers etc. have been excluded in the calculation.

There was no significant difference in the retentions of creosote between the emulsion and HTC. The variability in retentions within each preservative and temperature was similar to that obtained in other experiments. There was no correlation between noticeable defects in the quadrants and retention levels achieved.

The 30° C. increase in treatment temperature did not result in higher retentions for either preservative. If satisfactory treatments can be achieved at the lower temperatures in commercial operations in Australia, the result would be considerable savings in energy consumption. All the treated quadrants recorded individual weight retentions of creosote far in excess of the specified value of 134 kg/m$^3$ in the Australian Standard 2209-1979.

PRESSURE PLANT CONDITIONS IMMEDIATELY AFTER TREATMENT

HTC fuming was prolific with yellow vapour halos at the cylinder mouth and quadrant surfaces. HTC fumes persisted on the samples for hours after treatment. Breathing was made difficult and attempts to withdraw treated samples had to be delayed. Even at 90° C. the fuming of the emulsion of this example was very much less than HTC. The odour of the emulsion of the example was not typical of creosote, nor was it offensive. Some minor sludging in the cylinder was noted after the 90° C. treatments. Visual stability of the emulsion of this example under such severe conditions, was not affected.

SURFACE CONDITION OF TREATED SAMPLES

The quadrants treated by the emulsion of this example appeared almost dry when removed from the treatment cylinder, particularly after the 90° C. treatments.

Little or no greasiness on the quadrants made manual handling easy and safe. Initially the quadrant surfaces which were treated with HTC (in the first few runs) appeared dry but subsequent treatments produced samples that were wet and oily. This may be due to the fact that some low boiling point components of the HTC have evaporated during the initial runs and the oxidation and polymerisation of some creosote components during further pressure treatments have produced the dirty surface as observed. The wet and slippery HTC treated quadrants were unsafe to handle. Excessive surface checking of the samples after treatment with HTC was noted, when compared with the samples treated according to the invention. The water component of the emulsion may have swelled the timber substrate and caused some checks to close up.

For the first few days after treatment, creosote bleeding was evident along large checks and splits in both sets of samples. Some pigment was lost from quadrant surfaces treated according to the invention due to light rain and night frosts but they remained fairly dry and pleasing in appearance. The HTC treated samples were wet and oily. Samples were cut from the treated quadrants and the top sections (see FIG. 2) were then exposed on bearers in the open. After about eight months o weathering, many of the quadrants of the emulsions of this example showed some "crudding" especially adjacent to checks and splits. Most of this "crud" remained dry and shiny. Fairly severe "crudding" was observed on most of the HTC samples and this exudate was soft and sticky in hot weather, very much like a tar coating. The surfaces of samples treated according to the invention were still dry whereas most of the HTC treated samples were wet and oily.

PENETRATION AND MACRO-DISTRIBUTION

Cutting and planing of creosote treated timber at normal temperature will mobilise the preservative. Smearing and creeping of creosote on the cut surfaces will give an incorrect visual impression of the preservative penetration and distribution. In an attempt to overcome this, all cut samples were frozen for many weeks. The frozen discs (see FIG. 2) were then machine-planed and immediately photographed for later visual assessment of the treated zone across the grains. Similarly, the longitudinal penetration pattern of the treated zone was recorded by first cutting along the frozen butt section (see FIG. 2) and one of the cut faces was machine-planed and immediately photographed.

Both black and white photographs and colour slides of all the treated quadrants were made and there appeared to be no distinct difference in the macro-distribution of either preservative in the matched quadrants. In all specimens, except in wound-affected sapwood, complete depth of sapwood penetration was visible.

ANALYSIS OF THE EMULSION OF THIS EXAMPLE OVER 12 CHARGES (a) Water content

The water content of all emulsion samples was determined by Dean and Stark method according to the STPTC CO-2 Standard. Within each charge the water content decreased after treatment, with a greater difference in the earlier charges. Between some charges it was necessary to add fresh emulsion and this produced an increase in water content. Overall, during 12 cylinder runs the water content decreased by 3%. Although no correction for water was made during these studies it would be necessary to carry out such an operation in commercial treatment plants at a predetermined water content. The change in water content had no apparent effect upon the stability of the emulsion nor the retention levels achieved in the quadrants. This result is particularly encouraging in that six out of the 12 charges were carried out at 90° C. and it is generally accepted that high temperatures are detrimental to the stability of emulsions.

(b) Pigment

There was no evidence to indicate that there was pigment coalescence, separation or sedimentation in the emulsion. The pigment content of the samples was determined by slow evaporation of the preservative in glazed porcelain crucibles followed by ignition for three days at 550° C. For all 12 runs, the emulsion showed no progressive loss of pigment.

(c) pH

The pH of the alkaline anionic emulsion varied slightly as treatment progressed. Results did not show a consistent lowering of pH during the 12 charges. This is particularly encouraging since the acidity of the hardwoods used (which is normally pH 4 to 5) has not drastically affected the alkalinity of the emulsion.

(d) Viscosity

The viscosity and rheology of each sample was precisely determined and investigated at 20° C., 35° C., 50° C., 70° C. and 90° C. over a wide range of shear rates. The viscosity/temperature curves and rheograms so produced exhibited little change for all 12 runs. Considering the treatment conditions, which the emulsion was subjected to, e.g. high temperature and shearing under pressure in the presence of timber, its rheological behaviour to date is very satisfactory. The emulsion was designed and processed to exhibit pseudo-plastic behaviour with a definite yield value. Above 60° C. the emulsion exhibits Newtonian behaviour.

(e) Microscopy

Several samples of the emulsion were microscopically examined. The emulsion appeared to have improved in homogeneous appearance with the treatments. No visible evidence of coalescence of pigment or water was noted. Fine particle size was predominant with the pigment well distributed in both phases.

EXAMPLE 104

More than 300 000 L of the following emulsions manufactured by Koppers Australia Pty Limited at their Officer, Victoria, treatment plant.

| FORMULATION A | FORMULATION B |
|---|---|
| As in Example 1 with the exception of pigment which was present at 5% as MC-1 brown. | As in Example 1 with the exception of pigment which was present at 5% MC-W white. |

This plant possesses two cylinders (12.0 m × 1.1 m and 15.2 m × 1.8 m) with the capability of treating commodities—notably poles—up to pressures of 6900 kPa. A prototype installation for manufacturing creosote emulsions of the invention has been built to service the treatment cylinders. The plant has treated some 4000 transmission poles. In addition a number of railway sleepers have also been treated with the emulsion of this example; air-dried sleepers of various species from northern New South Wales and Tasmania were treated with a Bethel schedule, while some sleepers were first conditioned by Boultonising and pressure treated in conventional HTC and subsequently pressure treated with the emulsion of this example.

The commercial operations have involved both Lowry and Bethel treatment schedules with a wide range of hardwood timbers, employing a brown-pigmented (Formulation A) and a white-pigmented (Formulation B) emulsion. The latter produces commodities with pleasing, light olive-coloured surfaces. The air-dried sleepers which have been treated with the white formulation have developed a grey colour, in no way resembling conventional creosote-treated sleepers.

Odour from both white and brown emulsion impregnated poles and sleepers is markedly reduced.

The treatment details have indicated that customer requirements can be met satisfactorily, especially in the case of retention and penetration criteria. A summary of selected data obtained during commercial and pilot plant operations is presented in Table 4.

TABLE 4

| Commodity (No. in sample) | Emulsion Mean | Retentions Range | $(kg/m^3)^1$ Regmnt$^2$ | Penetration depth$^3$ |
|---|---|---|---|---|
| Hardwood poles-Class 1 durability (772) | 250 | 121–694 | 170 | Full sapwood |
| Hardwood poles-Class 2 durability (234) | 353 | 136–389 | 170 | Full sapwood |
| Hardwood poles-Class 3 durability (297) | 283 | 122–612 | 200 | Full sapwood |
| Softwood posts (75) | 141$^4$ | 78–248 | 128 | Full sapwood |
| Incised hardwood sleepers (12) sapwood | 170$^5$ | 99–248 | 65$^6$ | Full sapwood |
| heartwood | 97 | 56–218 | | Incisions to c. 11 mm |

$^1$Individual specimen, based on sapwood volume measurements, except for softwood posts where total volume used. Note that about 5% of total poles failed to meet requirements, but these were all successfully retreated.
$^2$Minimum charge, whole creosote (HTC).
$^3$Visual determination from cores or cross-sections.
$^4$Average of mixture of different treatment schedules.
$^5$The data for more than 200 additional sleepers has not been fully processed for individual retentions and penetration patterns. Retentions shown were obtained by extraction analysis.
$^6$New South Wales requirement only, based on total volume.

Handling characteristics are acceptable, even when considering the small number of bleeding poles which have occurred within the population of several thousand emulsion treated poles to date. In this respect it is apparent that the prevailing climatic conditions and the post treatment hold-time can influence surface quality. In addition, pole stack configuration has been observed to markedly affect surface drying characteristics. Odour is negligible, even during hot weather.

EXAMPLE 105

The procedure of Example 1 was followed using the following components to produce a white coloured creosote anionic oil-in-water emulsion.

| | Parts by Weight |
|---|---|
| Distilled water | 80 |
| (1) Polysaccharide | 0.2 |
| (2) Resin soap | 1.5 |
| (3) Alkane Sulfonate Sodium Salt | 0.12 |
| High Temperature Creosote (AS 1143) | 20 |
| (4) Pigment MC.W White | 5 |
| (5) Lignin Sulfonate | 0.4 |
| (6) ANTI-SETTLE C.V.P. | 0.5 |
| (7) thiocyanomethylthio) benzothiazole) | 0.12 |

(1) KELZAN D.
(2) Alkali Metal Salt of Vinsol Resin
(3) LUTENSIT A.P.S.
(4) Harshaw All Phase Pre-Dispersed Pigment
(5) POLYFON F.
(6) Cray Valley Products U.K.
(7) Registered Trademark Buckman Laboratories Inc., U.S.A.

We claim:

1. A preservative composition which is ultra stable in the presence of wood extractives comprising
    (a) an emulsion of a wood preservative grade creosote;
    (b) 5–95% water;
    (c) one or more pre-dispersed micronized pigments;
    (d) a rheology structuring agent present in an amount of 2.5 weight percent or less, said rheology structuring agent being selected from the group consisting of carboxyvinyl polymers having molecular weight sufficiently high to enable said polymers to impart thixotropic properties to the composition, modified hydrogenated castor oil, bentonite clays, fumed silica, polysaccharides, naphthalenes, fatty acid derivatives and water soluble polyethylene oxides having molecular weight sufficient to enable said polyethylene oxides to impart theopectic properties to the composition;
    (e) 0.25 to 10 weight percent of a soap which is an alkali metal salt of a wood derived resin acid;
    (f) 0.1 to 5 weight percent of one of the surfactants selected from the group consisting of nonylphenyl ethoxylates, alkanolamides, soya lecithins, ethoxylated sorbitan esters, alkyl and glycol esters, sulfonated castor oils, amine ethoxylates, acrylic co-polymers, fluorinated surfactants, poly(organosiloxane) surfactants, fatty acid soaps, sodium lauryl sulfates, octyl phenol ethoxylates, cetyl stearyl alcohol ethoxylates, propylene glycol ethoxylates, alkyl aryl ethers, ethylene oxide condensates and sulfonates;
    (g) 0.25 to 2 weight percent of one of the natural or synthetic pigment modifying resins or anti-settle additives selected from the group consisting of gum copol, gum rosin, vatica resins, shellac, wood rosin, tall oil rosin, chinese wood oil, high molecular weight primary amines derived from pine resin acids, casein, aliphatic resins, aromatic resins, coumaroneindene, terpene resins, polyterpene resins, terpene phenol, alkyd resins, rhodenes, polyurethane resins, silicone resins and unmodified hydrogenated castor oil;
    (h) 0.25 to 5 weight percent of a lignin sulfonate; said emulsion having been produced under conditions of ultra-high sheer.

2. The composition, as in claim 1, wherein component (d) comprises 0.1–0.2 percent by weight component (e) comprises 1–5 percent by weight of an alkali metal salt of a wood derived resin acid
    component (f) comprises 0.1–0.5 weight percent of the composition and
    component (g) comprises 0.25–2 weight percent of the natural or synthetic resin.

3. The composition as in claim 1 wherein component (g) is present in an amount up to 60 weight percent of the composition.

4. The composition as defined in claim 3 wherein component (g) is present in an amount from 3.5 to 6 wt%.

5. A composition as in claim 1 wherein the creosote is chemically modified to produce a color from one of the components thereof, prior to formation of the emulsion.

6. A composition as in claim 1 which is an oil-in-water emulsion.

7. A composition as in claim 2 which is a water-in-oil emulsion.

8. A process for the manufacture of a preservative composition, which process comprises the steps of:
(i) dissolving 2.5% by weight or less, based on the total weight of said composition, of one of the group of rheology structuring agents consisting of carboxyvinyl polymers having molecular weight sufficiently high to enable said polymers to impart thixotropic properties to the composition, bentonite clays, fumed silica, polysaccharides, naphthalene, fatty acid derivatives, water soluble polyethylene oxides having molecular weight sufficient to enable said polyethylene oxides to impart rheopectic properties to the composition, and modified hydrogenated castor oil; in 5 to 95% by weight of water based on the total weight of said composition to form a first solution,
(ii) aging the first solution for at least 8 hours,
(iii) dissolving or forming from 0.25–10 weight percent of a soap which is an alkali metal salt of a wood derived resin acid, and dissolving from 0.1 to 5% by weight based on the total weight of said composition of one of the group of surfactants consisting of nonylphenylethoxylates, alkanolamides, soya lecithins, ethoxylated sorbitan esters, alkyl and glycol esters, sulfonated castor oils, amine ethoxylates, acrylic copolymers, fluorinated surfactants, poly(organosiloxane) surfactants, fatty acid soaps, sodium lauryl sulfates, octyl phenol ethoxylates, cetyl stearyl alcohol ethoxylates, propylene glycol ethoxylates, alkyl aryl ethers, ethylene oxide condensates and sulfonates, in the aged first solution, concurrently or sequentially in any order, to form a second solution;
(iv) adding the second solution to creosote and forming a first emulsion under conditions of ultra-high shear;
(v) adding at least one pre-dispersed micronised pigment to the first emulsion;
(vi) adding from 0.25 to 5% by weight based on the weight of the composition of a lignin sulfonate to said first emulsion to form a second emulsion; and
(vii) adding to said second emulsion from 0.25 to 2% by weight based on the weight of the composition of a natural resin; said process further comprising mixing under conditions of ultra-high shear after each of steps (v), (vi) and (vii).

9. A process as in claim 8 wherein the creosote is chemically modified to produce a color from one of the components thereof prior to formation of the emulsion.

10. A method of preserving lignocellulosic substrates which method comprises applying to the substrates a preservative composition as in claim 1.

11. A method as defined in claim 10, wherein the composition is applied by impregnation at ambient or elevated pressures and at ambient or elevated temperatures.

12. The method as defined in claim 10, wherein the composition is applied by spraying, brushing or rolling.

13. A method according to claim 10 wherein the composition contains at least one thermal setting additive, and wherein the lignocellulosic or other substrate is heated after the application of the composition.

14. A process for the manufacture of a preservative composition, which process consists of the following steps exclusively in the order presented
(i) dissolving 2.5% by weight or less, based on the total weight of said composition, of one of the group of rheology structuring agents consisting of carboxyvinyl polymers having molecular weight sufficiently high to enable said polymers to impart thixotropy to the composition, bentonite clays, fumed silica, polysaccharides, naphthalenes, fatty acid derivatives, water soluble polyethylene oxides having molecular weight sufficient to enable said polyethylene oxides to impart rheopexy to the composition and modified hydrogenated castor oil in 5 to 95% by weight of water based on the total weight of said composition to form a first solution,
(ii) aging the first solution for at least 8 hours to complete solvation,
(iii) dissolving or forming from 0.25 to 10 weight per cent of a soap which is an alkali metal salt of a wood derived resin acid, and dissolving from 0.1 to 5% by weight based on the total weight of said composition of one of the group of surfactants consisting of nonylphenylethoxylates, alkanolamides, soya lecithins, ethoxylated sorbitan esters, alkyl and glycol esters, sulfonated castor oils, amine ethoxylates, acrylic copolymers, fluorinated surfactants poly(organosiloxane) surfactants, fatty acid soaps sodium lauryl sulfates, octyl phenyl ethoxylates, cetyl stearyl alcohol ethoxylates, propylene glycol ethoxylates, alkyl aryl ethers, ethylene oxide condensates and sulfonates, in the aged first solution in order to form a second solution;
(iv) adding the second solution to creosote and forming a first emulsion under conditions of ultra-high shear;
(v) adding at least one pre-dispersed micronised pigment to the first emulsion;
(vi) adding from 0.25 to 5% by weight based on the weight of the composition of a lignin sulfonate to said first emulsion to form a second emulsion; and
(vii) adding to said second emulsion from 0.25 to 2% by weight based on the weight of the composition of a pigment modifying resin; said process further comprising mixing under conditions of ultra-high shear after each of steps (v), (vi) and (vii).

15. The composition, as in claim 1, wherein the high molecular weight carboxyvinyl polymers have a molecular weight of 1,250,00 or 4,000,000.

16. A composition as claimed in claim 1 wherein the rheology structuring agent is a water soluble polyethylene oxide having an approximate weight average molecular weight of between 300,000 and 5 million.

17. A method as claimed in claim 8 wherein the rheology structuring agent is a water soluble polyethylene oxide having an approximate weight average molecular weight of between 300,000 and 5 million.

18. A method as claimed in claim 14 wherein the rheology structuring agent is a water soluble polyethylene oxide having an approximate weight average molecular weight of between 300,000 and 5 million.

* * * * *